Patented Feb. 29, 1944

UNITED STATES PATENT OFFICE 2,342,648

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application September 8, 1941, Serial No. 410,082

16 Claims. (Cl. 252—344)

This invention relates to a process for breaking petroleum emulsions, my present application being a continuation, in part, of my co-pending application, Serial No. 360,802, filed October 11, 1940, now U. S. Patent No. 2,262,739, dated November 11, 1941, which discloses a process for preventing water-in-oil type emulsions resulting from acidization of calcareous oil-bearing strata, wherein the treating agent employed is a composition of matter consisting of a mineral acid, such as hydrochloric acid, in admixture with a particular emulsion-preventing agent specifically described in said application. In said aforementioned co-pending application the emulsion-preventing agent was referred to in view of the most suitable method of manufacture, as a condensation product. Attention is directed to the fact that my above mentioned application makes it clear that the condensation product or products therein described as (1st) new compositions of matter, (2nd) that a large variety of the materials therein described represent surface-active materials, or more specifically, cation-active materials, (3rd) and that the products or materials described in said application are adapted for use as demulsifiers in the manner that demulsifying materials are most widely used in the production of crude oil or removal of salt in refinery practice.

The subsequent subject-matter of the instant specification is substantially a verbatim copy of the subject-matter appearing in the aforementioned co-pending application, except that there is eliminated such data as is concerned primarily with acidization of calcareous structure, and reference to the matter contemplated is as a condensation product, chemical compound, or the like, rather than specific reference to it as an emulsion-preventing agent.

The chemical compound or condensation product used as the demulsifying agent in my herein disclosed process for breaking petroleum emulsions of the water-in-oil type, is derived from the following reactants: to wit, a high molal, water-insoluble alcohol having at least 9 carbon atoms and may have as many as 31 or more carbon atoms; and a hydroxylated polyamine containing at least one amino nitrogen atom not directly linked to a hydroxy hydrocarbon radical, and preferably, at least two such nitrogen atoms free from direct linkage with a hydroxy hydrocarbon radical.

Such reactants are mixed in the proportion so that there is at least one mole of a high molal alcohol for each mole of the hydroxylated polyamine. The condensation process consists essentially in heating the mixture at a temperature of about 200° C. or higher, but below the decomposition point of the resulting hydrotropic material, and is conducted so as to effect such condensation between the reactants. The maximum temperature generally employable is about 300° C. The preferred range is about 235–300° C.; and in a general way, 250–275° C. represents an optimum range for a variety of the reactants employed. The reaction is conducted in absence of a catalyst. It has been found that the type of catalyst which hastens reaction is apt to produce rapid polymerization of the hydroxylated amine. The condensation product of a high molal alcohol and a polymerized hydroxylated amine represents a type of material not contemplated by my invention.

The specific composition of the condensation products obtained in the manner briefly outlined above is unknown, although, in a general way, ethereal linkages must be involved. For this reason many of the properties of the materials are unpredictable. It is surprising to find that such materials are stable for an extended period of time in half-concentrated hydrochloric acid or other similar mineral acids. It is likewise remarkable to note that such solutions in acid, and particularly in relatively low ratios, as hereinafter described, give a very pronounced lowering of the surface tension. This is especially true in such compounds or condensation products that are derived at relatively high temperatures, and especially if derived from polyamino reactants having at least two amino nitrogen atoms not directly attached to a hydroxy hydrocarbon radical.

In practising my present process for breaking petroleum emulsions of the water-in-oil type, a treating agent or demulsifier, consisting of a material of the kind above referred to, is brought into contact with or caused to act upon the emulsion to be treated, in any of the various ways, or by any of the various apparatus now generally used to resolve or break petroleum emulsions with a chemical reagent, the above procedure being used alone or in combination with other demulsifying procedure, such as the electrical dehydration process. I have found that the above described demulsifier is particularly efficient for resolving emulsions of the kind which occur in de-salting procedure as employed in oil refineries.

One class of reactants employed as a raw material in the manufacture of the herein contemplated compounds is the class of high molal water-insoluble alcohols. Such high molal alcohols are well known compounds, and the method of producing or obtaining the same is common knowledge. Briefly stated, such high molal alcohols may be aliphatic, alicyclic, or cycloaliphatic in nature. They may be primary, secondary, or tertiary alcohols, and may be saturated or unsaturated. They may be derived from different sources. Some of the alcohols occur in nature as a constituent of naturally-occurring waxes. Such alcohols include the following: cetyl alcohol, octadecyl alcohol, arachyl alcohol, carnaubyl alcohol, ceryl alcohol, myricyl alcohol, pisangceryl alcohol. Other alcohols are obtained from natural fats (vegetable or animal oils or fats) and from waxes, by reduction or other processes. Examples of suitable materials for use as reduction reactants are tallow, sperm oil, cocoanut oil, etc. Such alcohols are frequently designated by indicating the source of fatty acids or the like from which they are obtained. Thus, they may be referred to as oleyl alcohol, stearyl alcohol, ricinoleyl, etc. The same procedure which is employed in connection with the conversion of fatty acids or their esters to alcohols, is also applicable to somewhat kindred monocarboxy acids or esters, such as naphthenic acid, abietic acid, and the like; and thus there are available corresponding naphthenyl alcohols, abietyl alcohols, etc. Water-insoluble cycloaliphatic alcohols are obtained in various ways, including reactions between a phenolic body and an alkylene oxide, such as ethylene oxide, or between a phenolate and a monochlorhydrin, or the like. Alcohols somewhat similar to abietyl alcohols, and sometimes referred to as resin alcohols, are derived from resins, such as dammar, copal, etc. The alcohols may have straight chains or branched chains.

Examples include nonyl alcohol, decyl alcohol, dodecyl alcohol, tetradecyl alcohol, hexadecyl alcohol, octadecyl alcohol, and the like.

Another class of alcohols is derived from oxidized petroleum, which consists predominantly of secondary aliphatic alcohols contained in a range of about 9–28 carbon atoms per molecule. See U. S. Patent No. 1,909,295, dated May 16, 1933, to Luther et al. See also U. S. Patent No. 2,108,756, dated February 15, 1938, to McAllister. As to a number of alcohols containing 9–25 carbon atoms and which represent secondary alcohols of the branch chain type, see U. S. Patent No. 2,088,020, dated July 27, 1937, to Wickert. As to other suitable high molal tertiary alcohols, reference is made to U. S. Patent No. 2,084,253, dated June 15, 1937, to Hintermaier. As to certain cycloaliphatic alcohols, see U. S. Patent No. 2,174,131, dated September 26, 1939, to Lubs.

As to unsaturated alcohols, for example, attention is directed to those which occur naturally as a constituent of sperm oil or the like, and further reference is made to U. S. Patent No. 2,199,403, dated May 7, 1940, to Henk et al.

The second class of raw materials employed as reactants in producing the demulsifying agent employed in my process, are the hydroxylated polyamines, characterized by the presence of at least one amino nitrogen atom not directly attached to a hydroxy hydrocarbon radical, are well known compounds. They may be obtained in various ways. The commonest procedure is to treat a polyamine with an alkylene oxide or its equivalent, such as ethylene oxide, propylene oxide, glycidol, or the like. The commoner polyamines which can be so treated with an oxyalkylating agent include the following: ethylene diamine; diethylene triamine; triethylene tetramine; tetraethylene pentamine; pentaethylenehexamine; propylene diamine; dipropylene triamine; tripropylene tetramine; tetrapropylene pentamine; pentapropylene hexamine, etc. In some instances such amines may be treated with an alkylating agent or the like so as to introduce an alkyl, aralkyl, or alicyclic radical into the compound as a substitute for an amino hydrogen atom. For instance, one may obtain diethyl tetraethylene pentamine in the conventional manner using ethyl iodide or the like as an alkylating agent.

In any event, having selected a suitable polyamine, the product is then treated with any acceptable oxy-alkylating agent, such as ethylene oxide, propylene oxide, and the like. In view of the lower cost of ethylene oxide and in view of its greater activity, it is most frequently employed. For instance, ethylene diamine can be treated with one mole of ethylene oxide to produce hydroxyethylenediamine. Diethylene triamine can be treated with three moles of ethylene oxide so as to yield triethanol diethylene triamine. Triethylene tetramine can be treated with four moles of ethylene oxide to yield tetraethanol triethylene tetramine. Similarly, one can obtain tetraethanol tetraethylene pentamine, or tetraethanol pentaethylene hexamine. One can employ propylene oxide or glycidol to give similar products. In view of the fact that the most inexpensive polyamine now available is tetraethylene pentamine, I prefer to treat tetraethylene pentamine with three moles of ethylene oxide, four moles of ethylene oxide, or five moles of ethylene oxide, to give the corresponding triethanol, tetraethanol, and pentaethanol derivatives, and to employ such derivatives.

The condensation products employed are manufactured by a simple heat condensation process. The mixture of the two classes of reactants is subjected to a temperature sufficient to produce the desired condensation. Condensation usually starts at a temperature somewhere above 200° C. and takes place with a reasonable rapidity at the higher ranges previously indicated. Sometimes a temperature as high as 325° C. or thereabouts may be employed, provided that decomposition does not take place. I have found it most desirable to use aliphatic alcohols, rather than cycloaliphatic or alicyclic alcohols. Moreover, I have found that the primary alcohols react much more rapidly, as a rule, than the secondary or tertiary alcohols. My preference is to use aliphatic primary alcohols having approximately 10–22 carbon atoms. My preference is to introduce only one alcohol residue for each polyamine employed; but in many instances it is possible to introduce at least two and possibly three alcohol radicals for each mole of amine, particularly when such amine is highly hydroxylated, such as, for example, hexaethanol tetraethylene pentamine. Usually it is desirable to stir while reaction is taking place, particularly to prevent localized overheating. If a condensation product is not soluble enough for a particular purpose, either as such or in the form of a salt, such as the lactate, acetate, or the like, then an anlogous product should be obtained from a lower molal alcohol or from a polyamine having either (a) more amino nitrogen atoms; (b) more hydroxylated hydrocarbon radicals, such as ethanol radicals; (c) an amine that has both of these characteristics; and (d) employ glycerol or the like as an added reactant, as hereinafter described.

Thus, another procedure, hereinafter indicated, will be to add a third reactant, to wit, a polyhydric alcohol, such as glycerol, ethylene glycol, diethylene, butylene glycol, or the like. Such polyhydric alcohol enters into the condensation reaction in such a manner as to yield a product similar to the kind which would be obtained by treating the selected alcohol with an alkylene oxide, such as ethylene oxide, propylene oxide, or glycidol, prior to reaction with the amine; or if in an analogous manner, the polyhydroxylated amine had been subjected to similar treatment. This type will be illustrated by subsequent examples.

Inversely, in some instances a product may be too soluble, and thus not show maximum surface activity, or may not show optimum demulsifying effect. In such event, the hydrophile character can be decreased by following the reverse of the procedure above enumerated, i. e., (a) use more than one mol of alcohol per mole of polyamine; (b) use a high molal alcohol of an increased molecular weight; (c) use a polyamine having fewer amino nitrogen atoms; (d) use a polyamine having alkylol radicals or the like; (e) eliminate the addition of a polyhydric alcohol, such as glycerine, ethylene glycol, etc., to the reaction mass.

In order to obtain light-colored condensation products, it is most desirable to use glass-lined apparatus or vessels prepared from suitable non-ferrous alloys. It is most desirable that the reactants be stirred slowly during the polymerization process, and it is usually advantageous to make some arrangement for an elimination of water which may be formed. In the simplest aspect, this is most readily effected by employment of a hot condenser in connection with the reaction vessel. The temperature of such hot condenser is preferably slightly above 100° C. so as to permit the escape of water vapor, but to prevent the loss of any of the reactants by volatilization. In some instances it may be necessary to conduct the reaction for a fairly long period of time, for instances, 8-20 hours, or thereabouts. In many cases it is desirable to react the finished condensation product with some suitable acid, such as lactic acid, acetic acid, or the like, particularly when the condensation product is employed for some purpose other than acidization of calcareous structure.

In order to illustrate the manufacture of such condensation products, attention is directed to the following examples, in which the expression "pound mole" is used to indicate the molecular weight in pounds:

*Example 1*

A mixture is prepared using one pound mole each of the following: cetyl alcohol and tetraethanol tetraethylene pentamine. The temperature employed is approximately 275° C. The time of reaction is approximately 6-12 hours. The final completion of reaction is indicated by the fact that the product gives a clear solution in dilute acetic acid.

*Example 2*

Hexaethanol tetraethylene pentamine is substituted for tetraethanol tetraetyhlene pentamine in Example 1.

*Example 3*

Normal nonyl alcohol is substituted for cetyl alcohol in Examples 1 and 2.

*Example 4*

Normal decyl alcohol is substituted for normal nonyl alcohol in the preceding example.

*Example 5*

Dodecyl alcohol is substituted for nonyl alcohol in Example 3.

*Example 6*

Tetradecyl alcohol is substituted for nonyl alcohol in Example 3.

*Example 7*

The examples of the type previously indicated are repeated, with the addition of one pound mole of glycerol for each pound mole of the high molal alcohol.

*Example 8*

Example 7 is repeated using two pound moles of glycerol in each instance instead of one pound mole.

*Example 9*

Examples 1-8, inclusive, are repeated, using a temperature of approximately 300-325° C., except in those instances where too much alcohol would be volatilized.

Wherever the term "condensation product" is employed, it will be understood to cover a reaction product between the high molar water-insoluble alcohol, and the hydroxylated polyamine, wherein water or acid or the like is split out as a result of the union of the molecules of the two types of reactants. Similarly, the expression "condensing" is employed to refer specifically to the process whereby such condensation takes place.

In the hereto appended claims, reference to the use of the condensation product is intended to include the base form, i. e., the chemical combination of water, and also the salt form, such as the lactate, acetate, citrate, or the like.

Having thus described my invention, what I claim as new and desire to secure by Letters Patent is:

1. A process for breaking petroleum emulsions of the water-in-oil type, characterized by subjecting the emulsion to the action of a demulsifying agent comprising the condensation product derived from one mole of a hydroxylated polyalkylene amine containing at least one amino nitrogen atom not directly linked to a hydroxy hydrocarbon radical, and at least one mole of a high molal water-insoluble alcohol containing at least 9 carbon atoms and not more than 31 carbon atoms.

2. A process for breaking petroleum emulsions of the water-in-oil type, characterized by subjecting the emulsion to the action of a demulsifying agent comprising the condensation product derived from one mole of a hydroxylated polyalkylene amine containing at least one amino nitrogen atom not directly linked to a hydroxy hydrocarbon radical, and at least one mole of a high molal, water-insoluble, aliphatic alcohol containing at least 9 carbon atoms and not more than 31 carbon atoms.

3. A process for breaking petroleum emulsions of the water-in-oil type, characterized by subjecting the emulsion to the action of a demulsifying agent comprising the condensation product derived from one mole of a hydroxylated polyalkylene amine containing at least one amino nitrogen atom not directly linked to a hydroxy hydrocarbon radical, and at least one mole of a high molal, water-insoluble, primary aliphatic alcohol containing at least 9 carbon atoms and not more than 31 carbon atoms.

4. A process for breaking petroleum emulsions of the water-in-oil type, characterized by subjecting the emulsion to the action of a demulsifying agent comprising the condensation product derived from one mole of a hydroxylated polyalkylene amine containing at least two amino nitrogen atoms not directly linked to a hydroxy hydrocarbon radical, and at least one mole of a high molal, water-insoluble, primary aliphatic alcohol containing at least 9 carbon atoms and not more than 31 carbon atoms.

5. A process for breaking petroleum emulsions of the water-in-oil type, characterized by subjecting the emulsion to the action of a demulsifying agent comprising the condensation product derived from one mole of a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 31 carbon atoms.

6. A process for breaking petroleum emulsions of the water-in-oil type, characterized by subjecting the emulsion to the action of a demulsifying agent comprising the condensation product derived from one mole of a hydroxylated polyalkylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

7. A process for breaking petroleum emulsions of the water-in-oil type, characterized by subjecting the emulsion to the action of a demulsifying agent comprising the condensation product derived from one mole of a hydroxylated polyethylene amine containing at least two amino nitrogen atoms not directly linked to a hydroxy hydrocarbon radical, and one mole of a high molal, water-insoluble, primary aliphatic alcohol containing at least 9 carbon atoms and not more than 18 carbon atoms.

8. A process for breaking petroleum emulsions of the water-in-oil type, characterized by subjecting the emulsion to the action of a demulsifying agent comprising the condensation product derived from one mole of tetraethanol tetraethylene pentamine, and one mole of a high molal, water-insoluble, primary aliphatic alcohol containing at least 9 carbon atoms and not more than 18 carbon atoms.

9. A process for breaking petroleum emulsions of the water-in-oil type, characterized by subjecting the emulsion to the action of a demulsifying agent comprising the condensation product derived from one mole of a hydroxylated polyalkylene amine containing at least one amino nitrogen atom not directly linked to a hydroxy hydrocarbon radical, at least one mole of a high molal water-insoluble alcohol containing at least 9 carbon atoms and not more than 31 carbon atoms, and at least one mole of a polyhydric alcohol.

10. A process for breaking petroleum emulsions of the water-in-oil type, characterized by subjecting the emulsion to the action of a demulsifying agent comprising the condensation product derived from one mole of a hydroxylated polyalkylene amine containing at least one amino nitrogen atom not directly linked to a hydroxy hydrocarbon radical, at least one mole of a high molal, water-insoluble, aliphatic alcohol containing at least 9 carbon atoms and not more than 31 carbon atoms, and at least one mole of a polyhydric alcohol.

11. A process for breaking petroleum emulsions of the water-in-oil type, characterized by subjecting the emulsion to the action of a demulsifying agent comprising the condensation product derived from one mole of a hydroxylated polyalkylene amine containing at least one amino nitrogen atom not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

12. A process for breaking petroleum emulsions of the water-in-oil type, characterized by subjecting the emulsion to the action of a demulsifying agent comprising the condensation product derived from one mole of a hydroxylated polyalkylene amine containing at least two amino nitrogen atoms not directly linked to a hydroxy hydrocarbon radical, at least one mole of a high molal, water-insoluble, primary aliphatic alcohol containing at least 9 carbon atoms and not more than 31 carbon atoms, and at least one mole of a polyhydric alcohol.

13. A process for breaking petroleum emulsions of the water-in-oil type, characterized by subjecting the emulsion to the action of a demulsifying agent comprising the condensation product derived from one mole of a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 31 carbon atoms, and at least one mole of a polyhydric alcohol.

14. A process for breaking petroleum emulsions of the water-in-oil type, characterized by subjecting the emulsion to the action of a demulsifying agent comprising the condensation product derived from one mole of a hydroxylated polyalkylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

15. A process for breaking petroleum emulsions of the water-in-oil type, characterized by subjecting the emulsion to the action of a demulsifying agent comprising the condensation product derived from one mole of a hydroxylated polyethylene amine containing at least two amino nitrogen atoms not directly linked to a hydroxy hydrocarbon radical, one mole of a high molal, water-insoluble, primary aliphatic alcohol containing at least 9 carbon atoms and not more than 18 carbon atoms, and at least one mole of a polyhydric alcohol.

16. A process for breaking petroleum emulsions of the water-in-oil type, characterized by subjecting the emulsion to the action of a demulsifying agent comprising the condensation product derived from one mole of tetraethanol tetraethylene pentamine, one mole of a high molal, water-insoluble, primary aliphatic alcohol containing at least 9 carbon atoms and not more than 18 carbon atoms, and at least one mole of a polyhydric alcohol.

MELVIN DE GROOTE.